US011049115B2

United States Patent
Yang et al.

(10) Patent No.: US 11,049,115 B2
(45) Date of Patent: *Jun. 29, 2021

(54) BLOCKCHAIN-BASED BILL WRITE-OFF METHOD, APPARATUS, ELECTRONIC DEVICE, AND STORAGE MEDIUM

(71) Applicant: Advanced New Technologies Co., Ltd., George Town (KY)

(72) Inventors: Xueqing Yang, Hangzhou (CN); Longsheng Qing, Hangzhou (CN); Zhen Sun, Hangzhou (CN); Ge Jin, Hangzhou (CN); Zhenzhong Meng, Hangzhou (CN); Yu Chu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/783,075

(22) Filed: Feb. 5, 2020

(65) Prior Publication Data
US 2020/0175526 A1 Jun. 4, 2020

Related U.S. Application Data

(63) Continuation of application No. PCT/CN2020/072136, filed on Jan. 15, 2020.

(30) Foreign Application Priority Data

Jul. 31, 2019 (CN) .......................... 201910704689.9

(51) Int. Cl.
*G06Q 40/00* (2012.01)
*G06Q 30/00* (2012.01)
(Continued)

(52) U.S. Cl.
CPC ..... *G06Q 30/0185* (2013.01); *G06F 16/2379* (2019.01); *G06Q 10/10* (2013.01); *G06Q 30/04* (2013.01); *G06Q 40/02* (2013.01)

(58) Field of Classification Search
CPC ............ H04L 2209/56; G06Q 2220/00; G06Q 20/065; G06Q 20/0658; G06Q 20/389; G06Q 20/40; G06Q 20/4014
See application file for complete search history.

(56) References Cited

U.S. PATENT DOCUMENTS

| 5,892,900 A | 4/1999 | Ginter et al. |
| 2003/0126048 A1* | 7/2003 | Hollar .................... G06Q 30/06 705/30 |

(Continued)

FOREIGN PATENT DOCUMENTS

| CN | 106952094 | 7/2017 |
| CN | 107358420 | 11/2017 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Mike Anderson
(74) *Attorney, Agent, or Firm* — Fish & Richardson P.C.

(57) ABSTRACT

A target transaction to write off a target e-bill is received. In response to the target transaction, a write-off logic declared in a smart contract published on a blockchain is invoked. A bill number of the target e-bill is obtained, and whether the bill number matches an e-bill number segment maintained in a blockchain account corresponding to a bill issuer of the target e-bill is checked. In response to determining that the bill number matches the e-bill number segment maintained in the blockchain account corresponding to the bill issuer of (Continued)

the target e-bill, a validity check is performed on bill content of the target e-bill. After the validity check succeeds, generating a write-off completion event corresponding to the target e-bill is generated and published to the blockchain for storage.

20 Claims, 10 Drawing Sheets

(51) Int. Cl.
  *G06Q 30/04* (2012.01)
  *G06F 16/23* (2019.01)
  *G06Q 40/02* (2012.01)
  *G06Q 10/10* (2012.01)

(56) References Cited

U.S. PATENT DOCUMENTS

| | | | |
|---|---|---|---|
| 2004/0088255 A1* | 5/2004 | Zielke | G06Q 20/102 705/40 |
| 2008/0040265 A1 | 2/2008 | Rackley, III et al. | |
| 2010/0030675 A1* | 2/2010 | Hanan | G06Q 20/14 705/34 |
| 2013/0138570 A1 | 5/2013 | Ross | |
| 2017/0004550 A1* | 1/2017 | Shaaban | G06Q 30/04 |
| 2017/0236104 A1 | 8/2017 | Biton | |
| 2018/0075536 A1* | 3/2018 | Jayaram | G06Q 20/26 |
| 2018/0189755 A1 | 7/2018 | Kilpatrick et al. | |
| 2019/0080284 A1* | 3/2019 | Kim | G06Q 10/0833 |
| 2019/0130399 A1 | 5/2019 | Wright et al. | |
| 2019/0205884 A1* | 7/2019 | Batra | G06Q 10/0633 |
| 2020/0042960 A1* | 2/2020 | Cook | H04L 9/006 |
| 2020/0143337 A1 | 5/2020 | Conroy et al. | |
| 2020/0167840 A1 | 5/2020 | Sun et al. | |

FOREIGN PATENT DOCUMENTS

| | | |
|---|---|---|
| CN | 107977811 | 5/2018 |
| CN | 108961030 | 12/2018 |
| CN | 109146583 | 1/2019 |
| CN | 109191219 | 1/2019 |
| CN | 109325812 | 2/2019 |
| CN | 109636492 | 4/2019 |
| CN | 109949108 | 6/2019 |
| CN | 109949111 | 6/2019 |
| CN | 10019326 | 7/2019 |
| CN | 110046944 | 7/2019 |
| CN | 110046945 | 7/2019 |
| CN | 110046999 | 7/2019 |
| CN | 110060096 | 7/2019 |
| CN | 110458677 | 11/2019 |
| CN | 110473030 | 11/2019 |
| TW | 201801009 | 1/2018 |
| WO | WO 0186558 | 11/2001 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/072136, dated Apr. 24, 2020, 21 pages (with machine translation).
PCT International Search Report and Written Opinion in International Application No. PCT/CN2020/072141, dated Apr. 24, 2020, 19 pages (with machine translation).
U.S. Appl. No. 16/779,173, Jin et al., filed Jan. 31, 2020.
U.S. Appl. No. 16/779,198, Sun et al., filed Jan. 31, 2020.
U.S. Appl. No. 16/779,511, Yang et al., filed Jan. 31, 2020.
U.S. Appl. No. 16/783,094, Qing, filed Feb. 5, 2020.
U.S. Appl. No. 16/783,098, Meng et al., filed May 2, 2020.

* cited by examiner

BLOCKCHAIN-BASED BILL WRITE-OFF METHOD, APPARATUS, ELECTRONIC DEVICE, AND STORAGE MEDIUM

CROSS-REFERENCE TO RELATED APPLICATIONS

This application is a continuation of PCT Application No. PCT/CN2020/072136, filed on Jan. 15, 2020, which claims priority to Chinese Patent Application No. 201910704689.9, filed on Jul. 31, 2019, and each application is hereby incorporated by reference in its entirety.

TECHNICAL FIELD

One or more implementations of the present specification relate to the field of blockchain technologies, and in particular, to a blockchain-based bill write-off method, apparatus, an electronic device, and a storage medium.

BACKGROUND

The blockchain technology is also referred to as a distributed ledger technology, and is an emerging technology in which several computing devices jointly participate in "accounting" and jointly maintain a complete distributed database. The blockchain technology has been widely used in many fields because the blockchain technology features in decentralization, openness, and transparency, and each computing device can participate in database recording and quickly perform data synchronization.

SUMMARY

In view of this, one or more implementations of the present specification provide a blockchain-based bill write-off method, apparatus, an electronic device, and a storage medium.

To achieve the previous objective, the one or more implementations of the present specification provide the following technical solutions:

According to a first aspect, the one or more implementations of the present specification provide a blockchain-based bill write-off method, where the method is applied to a blockchain node, and the method includes: receiving a target transaction used to write off a target e-bill; in response to the target transaction, invoking write-off logic declared in a smart contract published on a blockchain, obtaining a bill number of the target e-bill, and checking whether the bill number matches an e-bill number segment maintained in a blockchain account corresponding to a bill issuer of the target e-bill, where the e-bill number segment maintained in the blockchain account is an e-bill number segment that is allocated to the blockchain account to issue an e-bill; and in response to determining that the bill number matches the e-bill number segment maintained in the blockchain account corresponding to the bill issuer of the target e-bill, further performing validity check on bill content of the target e-bill, and after the validity check succeeds, generating a write-off completion event corresponding to the target e-bill and publishing the write-off completion event to the blockchain for storage.

Optionally, the blockchain includes multiple levels of accounts used to maintain e-bill number segments; and the method further includes: receiving an application transaction sent by the bill issuer, where the application transaction includes an account identifier of the account of the bill issuer; in response to the application transaction, invoking number application logic declared in the smart contract published on the blockchain, determining an upper-level account of the blockchain account corresponding to the account identifier, and allocating an e-bill number to the bill issuer from an e-bill number segment maintained in the upper-level account; and adding the allocated e-bill number to the blockchain account of the bill issuer.

Optionally, the bill content of the target e-bill includes a bill amount, and the further performing validity check on bill content of the target e-bill includes: checking whether the bill amount of the target e-bill matches an entry amount of the target e-bill; and in response to determining that the bill amount of the target e-bill matches the entry amount of the target e-bill, determining that the validity check succeeds.

Optionally, the blockchain node is connected to a server of a billing supervisor of the e-bill by using an oracle machine; and the checking whether the bill amount of the target e-bill matches an entry amount of the target e-bill includes: obtaining a result of comparison between the bill amount of the target e-bill and the entry amount of the target e-bill from the server of the billing supervisor by using the oracle machine; and determining that the bill amount matches the entry amount when the obtained comparison result is that the bill amount is consistent with the entry amount.

Optionally, the obtaining a result of comparison between the bill amount of the target e-bill and the entry amount of the target e-bill from the server of the billing supervisor by using the oracle machine includes: generating a check success event for the bill number after determining, through checking, that the bill number matches the e-bill number segment maintained in the blockchain account corresponding to the bill issuer of the target e-bill, so that when detecting the check success event through listening, the server of the billing supervisor compares the bill amount recorded in the check success event with the entry amount and returns the comparison result by using the oracle machine.

Optionally, the obtaining a result of comparison between the bill amount of the target e-bill and the entry amount of the target e-bill from the server of the billing supervisor by using the oracle machine includes: sending a request for obtaining the result of comparison between the bill amount and the entry amount to the server of the billing supervisor by using the oracle machine, so that the server of the billing supervisor compares the bill amount with the entry amount of the target bill; and receiving the comparison result returned by the server of the billing supervisor by using the oracle machine.

Optionally, the blockchain is a consortium chain, and consortium members of the consortium chain include multiple levels of financial institutions served as billing supervisors, and bill institutions served as bill issuers.

According to a second aspect, the one or more implementations of the present specification provide a blockchain-based bill write-off apparatus, where the apparatus is applied to a blockchain node, and the apparatus includes: a write-off receiving unit, configured to receive a target transaction used to write off a target e-bill; a bill number check unit, configured to: in response to the target transaction, invoke write-off logic declared in a smart contract published on a blockchain, obtain a bill number of the target e-bill, and check whether the bill number matches an e-bill number segment maintained in a blockchain account corresponding to a bill issuer of the target e-bill, where the e-bill number segment maintained in the blockchain account is an e-bill number segment that is allocated to the blockchain account to issue an e-bill; and a validity check unit, configured to: in response to determining that the bill number matches the e-bill number segment maintained in the blockchain account corresponding to the bill issuer of the target e-bill, further perform validity check on bill content of the target e-bill, and after the validity check succeeds, generate a write-off completion event corresponding to the target e-bill and publish the write-off completion event to the blockchain for storage.

Optionally, the blockchain includes multiple levels of accounts used to maintain e-bill number segments; and the apparatus further includes: an application receiving unit, configured to receive an application transaction sent by the bill issuer, where the application transaction includes an account identifier of the account of the bill issuer; and an allocation unit, configured to: in response to the application transaction, invoke number application logic declared in the smart contract published on the blockchain, determine an upper-level account of the blockchain account corresponding to the account identifier, and allocate an e-bill number to the bill issuer from an e-bill number segment maintained in the upper-level account; and add the allocated e-bill number to the blockchain account of the bill issuer.

Optionally, the bill content of the target e-bill includes a bill amount, and the validity check unit is specifically configured to: check whether the bill amount of the target e-bill matches an entry amount of the target e-bill; and in response to determining that the bill amount of the target e-bill matches the entry amount of the target e-bill, determine that the validity check succeeds.

Optionally, the blockchain node is connected to a server of a billing supervisor of the e-bill by using an oracle machine; and the validity check unit is further configured to: obtain a result of comparison between the bill amount of the target e-bill and the entry amount of the target e-bill from the server of the billing supervisor by using the oracle machine; and determine that the bill amount matches the entry amount when the obtained comparison result is that the bill amount is consistent with the entry amount.

Optionally, the validity check unit is further configured to: generate a check success event for the bill number after determining, through checking, that the bill number matches the e-bill number segment maintained in the blockchain account corresponding to the bill issuer of the target e-bill, so that when detecting the check success event through listening, the server of the billing supervisor compares the bill amount recorded in the check success event with the entry amount and returns the comparison result by using the oracle machine.

Optionally, the validity check unit is further configured to: send a request for obtaining the result of comparison between the bill amount and the entry amount to the server of the billing supervisor by using the oracle machine, so that the server of the billing supervisor compares the bill amount with the entry amount of the target bill; and receive the comparison result returned by the server of the billing supervisor by using the oracle machine.

Optionally, the blockchain is a consortium chain, and consortium members of the consortium chain include multiple levels of financial institutions served as billing supervisors, and bill institutions served as bill issuers.

According to a third aspect, the one or more implementations of the present specification provide an electronic device, including: a processor; and a memory, configured to store a processor-executable instruction, where the processor runs the executable instruction to implement the blockchain-based bill write-off method according to any one of the previous implementations.

According to a fourth aspect, the implementations of the present disclosure provide a computer-readable storage medium, where the computer-readable storage medium stores a computer instruction, and the steps of the blockchain-based bill write-off method according to any one of the previous implementations are implemented when the instruction is executed by a processor.

In the previous technical solutions, an e-bill number segment is maintained in advance on a blockchain for a blockchain account to apply for a bill number. After each blockchain account obtains a bill number through application, the blockchain account can issue an e-bill by using the bill number obtained through application.

Based on the previous bill number application mechanism, when a target e-bill is written off, a smart contract is invoked to check whether a bill number of the target e-bill matches an e-bill number segment maintained in a blockchain account corresponding to a bill issuer of the target e-bill. Therefore, an e-bill forged by a write-off initiator can be prevented from being written off. Further, when the check on the bill number succeeds, validity check is performed on bill content of the target e-bill by using the smart contract. Therefore, the target e-bill can be comprehensively written off.

DESCRIPTION OF IMPLEMENTATIONS

Figure 1:
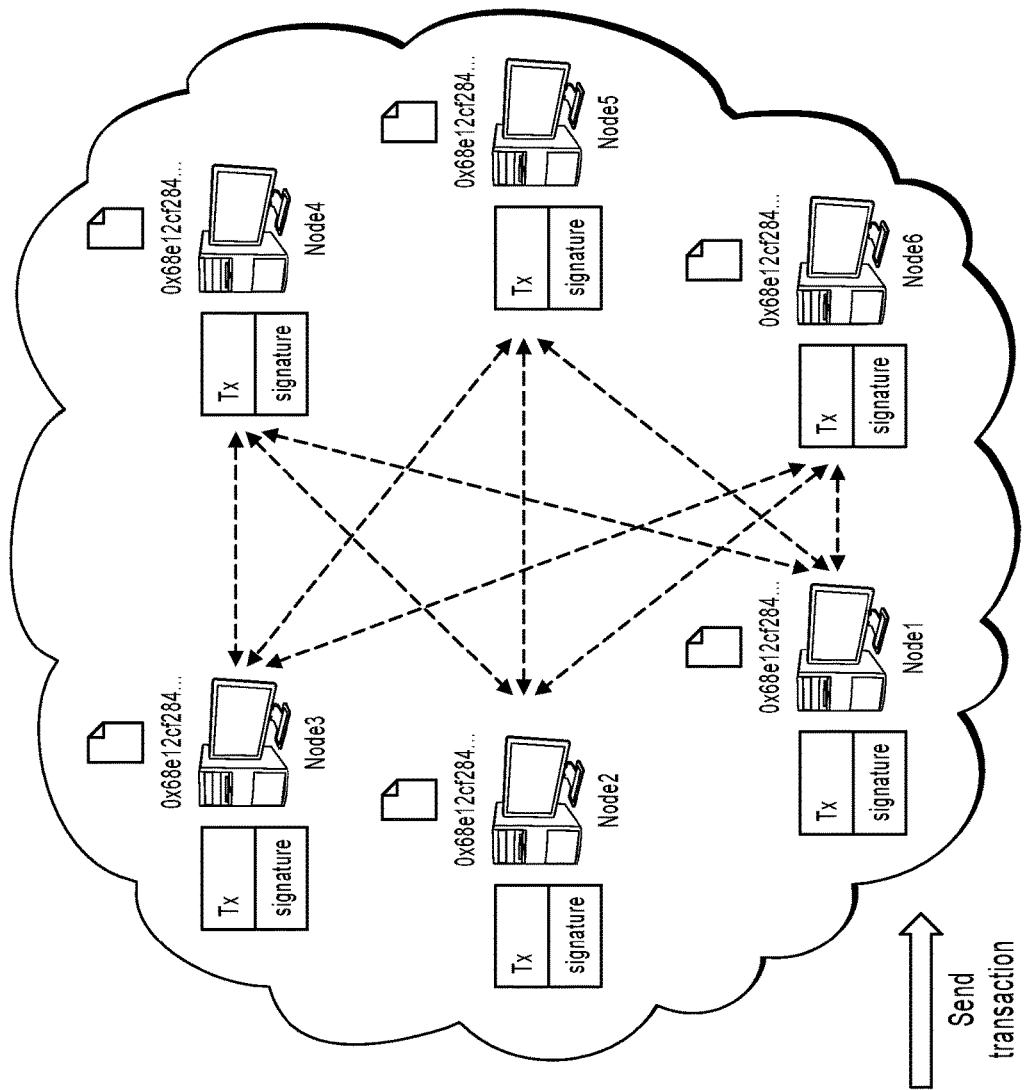
FIG. 1 is a schematic diagram illustrating smart contract creation, according to an example implementation.
Figure 1:
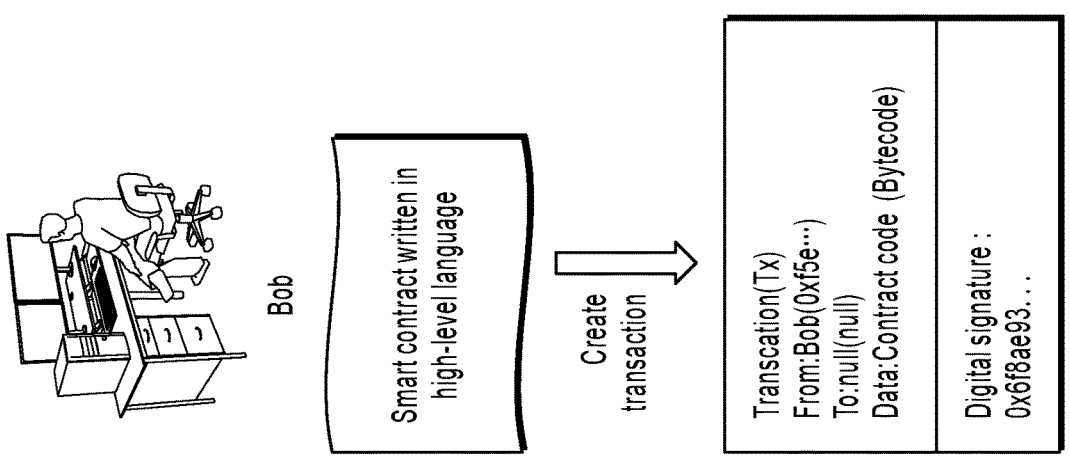

Example implementations are described in detail here, and examples of the implementations are presented in the accompanying drawings. When the following description relates to the accompanying drawings, unless specified otherwise, same numbers in different accompanying drawings represent same or similar elements. The implementations described in the following example implementations do not represent all implementations consistent with one or more implementations of the present specification. On the contrary, the implementations are merely examples of apparatuses and methods that are described in the appended claims in detail and consistent with some aspects of the one or more implementations of the present specification.

It is worthwhile to note that, in other implementations, steps of a corresponding method are not necessarily performed in a sequence shown and described in the present specification. In some other implementations, the method can include more or fewer steps than those described in the present specification. In addition, a single step described in the present specification can be divided into multiple steps in other implementations for description, and multiple steps described in the present specification can be combined into a single step for description in other implementations.

Blockchains are generally classified into three types: a public chain (Public Blockchain), a private chain (Private Blockchain), and a consortium chain (Consortium Blockchain). In addition, there can be combinations of the previous multiple types, such as a combination of a private chain and a consortium chain, and a combination of a consortium chain and a public chain.

The public chain has the highest degree of de-centralization. The public chain is represented by BITCOIN and ETHEREUM. Participants (which can also be referred to as blockchain nodes) in the public chain can read data records on the chain, participate in transactions, and contend for accounting permission of new blocks. In addition, each node can freely join or exit a network and perform a related operation.

On the contrary, in the private chain, write permission of the network is controlled by a certain organization or institution, and data read permission is specified by an organization. Briefly, the private chain can be a weakly centralized system, and the private chain has a strict limitation on nodes and has fewer nodes. This type of blockchain is more suitable for use inside a specific institution.

The consortium chain is a blockchain between the public chain and the private chain, and can be "partially decentralized". Each node in the consortium chain usually has an entity institution or organization corresponding to the node, and nodes join the network through authorization and form an interest-related consortium to jointly maintain blockchain operation.

Based on the basic features of the blockchain, the blockchain usually consists of several blocks. Timestamps corresponding to creation moments of the blocks are separately recorded in the blocks, and all the blocks form a time-ordered data chain strictly based on the timestamps recorded in the blocks.

Real data generated by the physical world can be constructed as a standard transaction format supported by the blockchain, and then published to the blockchain. Node devices in the blockchain perform consensus processing on a received transaction. After a consensus is reached, a node device used as an accounting node in the blockchain packs the transaction into a block for persistent storage in the blockchain.

Consensus algorithms supported by the blockchain can include a first type of consensus algorithm and a second type of consensus algorithm.

In the first type of consensus algorithm, node devices need to contend for accounting permission of each accounting period. For example, the first type of consensus algorithm is Proof of Work (POW), Proof of Stake (POS), or Delegated Proof of Stake (DPOS).

In the second type of consensus algorithm, an accounting node is selected in advance for each accounting period (without a need to contend for accounting permission). For example, the second type of consensus algorithm is Practical Byzantine Fault Tolerance (PBFT).

In a blockchain network using the first type of consensus algorithm, node devices that contend for accounting permission all can execute a transaction after receiving the transaction. One of the node devices that contend for accounting permission can win in the current round of accounting permission contention, and become an accounting node. The accounting node can pack a received transaction with other transactions to generate the latest block, and send the generated latest block or a block header of the latest block to other node devices for consensus.

In a blockchain network using the second type of consensus algorithm, a node device having accounting permission has been determined through negotiation before the current round of accounting. Therefore, after a node device receives a transaction, the node device can send the transaction to the accounting node if the node device is not the accounting node of the current round. The accounting node of the current round can execute the transaction when or before packing the transaction with other transactions to generate the latest block. After generating the latest block, the accounting node can send the generated latest block or a block header of the latest block to other node devices for consensus.

As described above, regardless of which type of consensus algorithm shown above is used in the blockchain, the accounting node of the current round can pack a received transaction to generate the latest block, and send the generated latest block or a block header of the latest block to other node devices for consensus check. After the other node devices receive the latest block or the block header of the latest block, if the other node devices determine, through check, that there is no problem on the latest block or the block header of the latest block, the latest block can be appended to the original blockchain to complete an accounting process of the blockchain. When checking a new block or block header sent by the accounting node, the other nodes can also execute a transaction included in the block.

In the blockchain field, an important concept is account. For example, for Ethereum, accounts are usually classified into two types: an external account and a contract account. The external account is an account directly controlled by a user and is also referred to as a user account. The contract account is created by a user by using an external account and is an account including contract code (namely, a smart contract). Certainly, for some blockchain models (such as an ant blockchain) derived from the Ethereum architecture, account types supported by the blockchains can be further extended. Implementations are not specially limited in the present specification.

For an account in the blockchain, an account state of the account is usually maintained by using a structure. When a transaction in a block is executed, a state of an account associated with the transaction in the blockchain usually also changes.

For example, for Ethereum, a structure of an account usually includes fields such as Balance, Nonce, Code, and Storage.

The Balance field is used to maintain a current account balance of the account.

The Nonce field is used to maintain a quantity of transactions of the account, and the field is a counter used to ensure that each transaction can be processed only once, to effectively avoid a replay attack.

The Code field is used to maintain contract code of the account. In practice, the Code field generally maintains only a hash value of the contract code. Therefore, the Code field is usually also referred to as a Codehash field.

The Storage field is used to maintain storage content of the account (a default field value is null). For a contract account, independent storage space is usually allocated to store storage content of the contract account. The independent storage space is usually referred to as account storage of the contract account. The storage content of the contract account is usually stored in the independent storage space by being constructed as a data structure of a Merkle Patricia Trie (MPT) tree. The MPT tree constructed based on the storage content of the contract account is usually also referred to as a storage tree. The Storage field usually maintains only a root node of the storage tree. Therefore, the Storage field is usually also referred to as a StorageRoot field.

For an external account, field values of the Code field and the Storage field shown above are both null.

For most blockchain models, the Merkle tree or a data structure based on the Merkle tree is usually used to store and maintain data. For example, for Ethereum, an MPT tree (a variant of the Merkle tree) is used as a data organization form to organize and manage important data such as an account state and transaction information.

In practice, a public chain, a private chain, and a consortium chain all may provide a smart contract function. A smart contract on a blockchain is a contract whose execution can be triggered by a transaction on the blockchain. The smart contract can be defined in a form of code.

For example, for Ethereum, users can be supported in creating and invoking some complex logic in an Ethereum network. Ethereum is a programmable blockchain, the core of Ethereum is an Ethereum virtual machine (EVM), and each Ethereum node can run the EVM. The EVM is a Turing-complete virtual machine, through which various types of complex logic can be implemented. A smart contract published and invoked by a user in Ethereum runs on the EVM. Actually, the EVM directly runs virtual machine code (virtual machine byte code, briefly referred to as "byte code" below), and therefore the smart contract deployed on the blockchain can be byte code.

As shown in FIG. 1, after Bob sends a transaction that includes information about creating a smart contract to an Ethereum network, each node can execute the transaction on an EVM. The From field of the transaction in FIG. 1 is used to record an address of an account that initiates to create the smart contract, contract code stored in a field value of the Data field of the transaction can be byte code, and a field value of the To field of the transaction is a null account. After an agreement is reached among nodes through a consensus mechanism, the smart contract is successfully created, and subsequently the user can invoke the smart contract.

After the smart contract is created, a contract account corresponding to the smart contract appears on the blockchain and has a specific address. For example, "0x68e12cf284 . . . " in each node in FIG. 1 represents the address of the created contract account. The contract code (Code) and account storage (Storage) will be stored in account storage of the contract account. Behavior of the smart contract is controlled by the contract code, and the account storage of the smart contract stores a state of the contract. In other words, the smart contract enables a virtual account including the contract code and the account storage to be generated on the blockchain.

As mentioned above, the Data field of the transaction that includes the information about creating the smart contract may store the byte code of the smart contract. The byte code consists of a series of bytes. Each byte can identify one operation. Considering various aspects such as development efficiency and readability, a developer may not write the byte code directly, but selects an advanced language to write the smart contract code. For example, the advanced language may be Solidity language, Serpent language, or LLL language. The smart contract code written in the advanced language can be compiled by a compiler, to generate byte code that can be deployed on the blockchain.

For example, for the Solidity language, contract code written in the Solidity language is very similar to a class in an object-oriented programming language, and multiple members can be declared in a contract, and includes a state variable, a function, a function modifier, an event, etc. The state variable is a value that is permanently stored in the account Storage field of the smart contract and is used to store a state of the contract.

Figure 2:
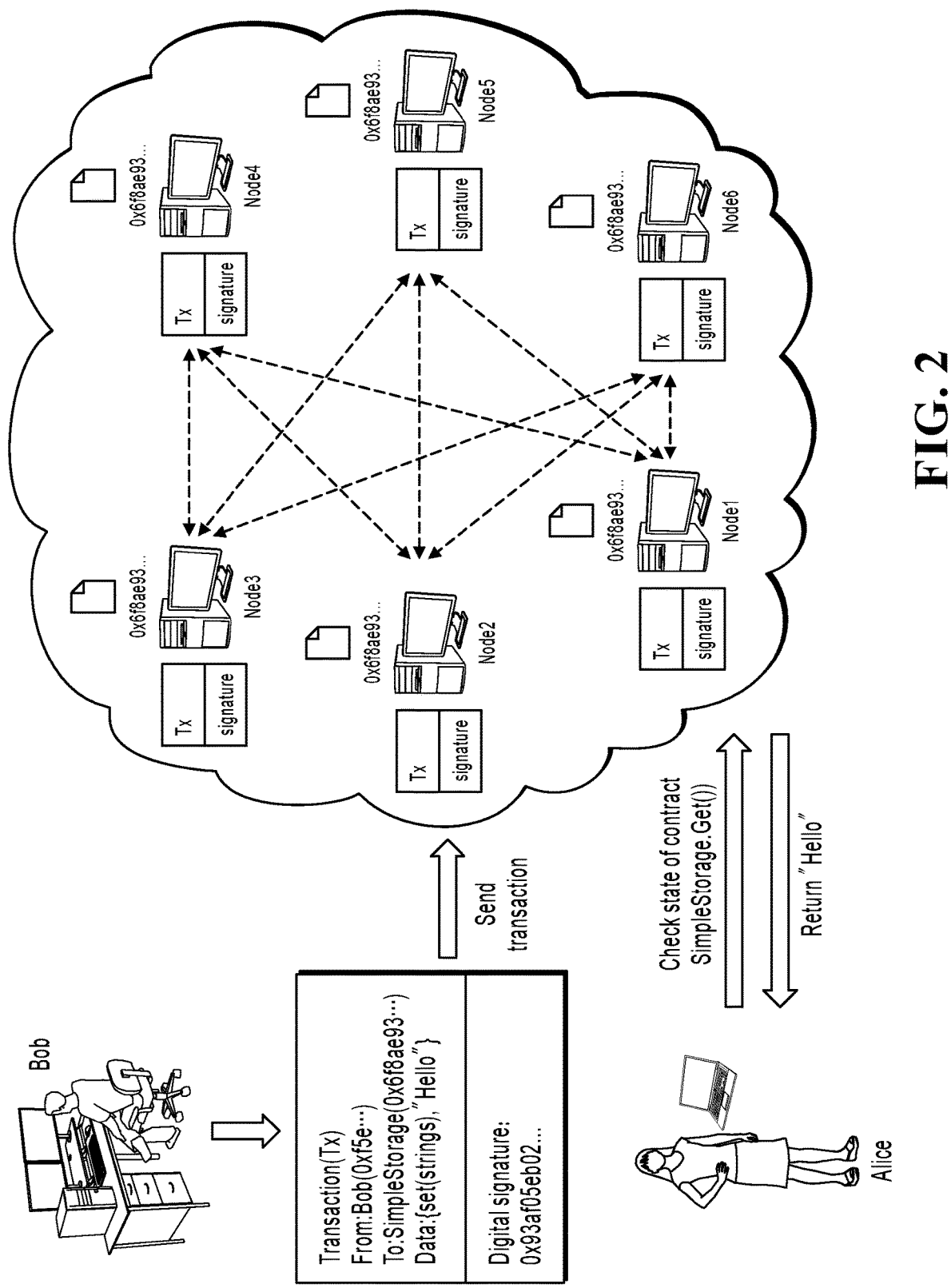
FIG. 2 is a schematic diagram illustrating smart contract invocation, according to an example implementation.

As shown in FIG. 2, Ethereum is still used as an example. After Bob sends a transaction that includes information about invoking a smart contract to an Ethereum network, each node can execute the transaction on an EVM. The From field of the transaction in FIG. 2 is used to record an address of an account that initiates to invoke the smart contract, the To field is used to record an address of the invoked smart contract, and the Data field of the transaction is used to record a method and a parameter used to invoke the smart contract. After the smart contract is invoked, an account state of a contract account may change. Subsequently, a certain client can view the account state of the contract account by using a blockchain node (for example, node 1 in FIG. 2) accessed by the client.

The smart contract can be executed independently on each node in the blockchain network in a specified way, and all execution records and data are stored in the blockchain. Therefore, after such a transaction is executed, a transaction voucher that can be neither tampered with nor lost is stored in the blockchain.

Figure 3:
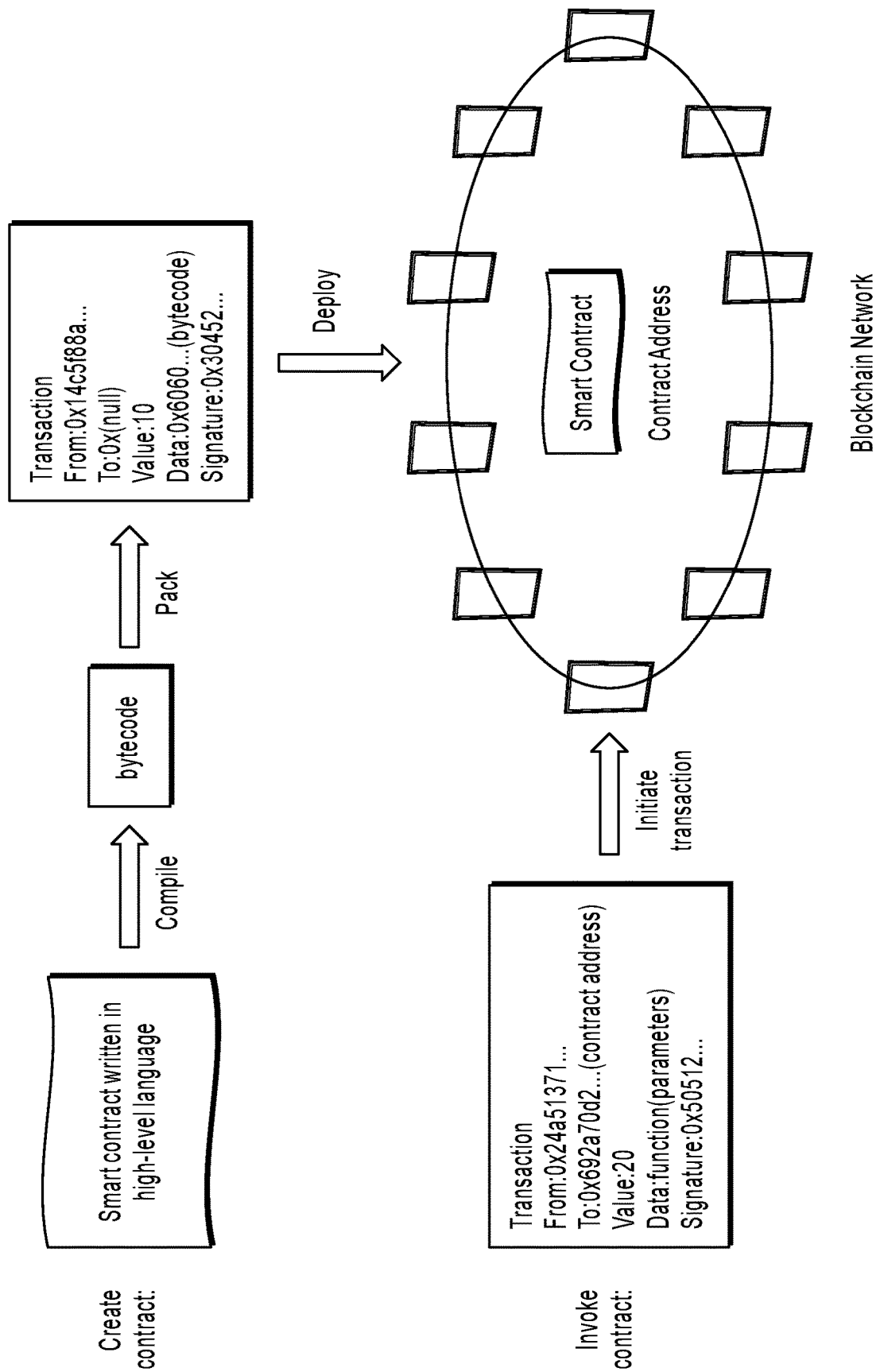
FIG. 3 is a schematic diagram illustrating smart contract creation and smart contract invocation, according to an example implementation.

A schematic diagram illustrating smart contract creation and smart contract invocation is shown in FIG. 3. To create a smart contract in Ethereum, processes such as writing a smart contract, convert smart contract code into byte code, and deploying the byte code on the blockchain are needed. Invoking a smart contract in Ethereum is initiating a transaction pointing to an address of the smart contract. An EVM of each node can separately execute the transaction, so that smart contract code can run on the virtual machine of each node in the Ethereum network in a distributed way.

For a conventional blockchain model represented by Ethereum, to implement "value transfer" on a blockchain, conversion of a currency in the real world into a virtual coin that can be circulated on the chain is usually supported.

In the blockchain field, some blockchain models (such as an ant blockchain) derived from the Ethereum architecture usually no longer support a function of converting a currency in the real world into a virtual coin that can be circulated on the chain. Instead, in these blockchain models, some physical assets without a currency attribute in the real world can be converted into virtual assets that can be circulated on the blockchain.

It is worthwhile to note that conversion of physical assets without a currency attribute in the real world into virtual assets on the blockchain is usually a process of "anchoring" the physical assets with virtual assets on the blockchain as a value support of the virtual assets, and then generating, on the blockchain, virtual assets that match the value of the physical assets and that can be circulated between blockchain accounts on the blockchain.

During implementation, an account type supported by the blockchain can be extended, and an asset account (also referred to as an asset object) can be further obtained by extending the account type supported by the blockchain. For example, an asset account can be obtained by extending an external account and a contract account supported by Ethereum. The obtained asset account corresponds to a virtual asset that can use a physical asset without a currency attribute in the real world as a value support and that can be circulated between blockchain accounts.

For a user accessing such a blockchain, in addition to creating a user account and a smart contract on the blockchain, the user can create a virtual asset that matches the value of a physical asset without a currency attribute in the real world on the blockchain, to be circulated on the blockchain.

For example, the user can convert held physical assets without a currency attribute, such as real estate, stock, loan contract, bill, and accounts receivable, into value-matched virtual assets to be circulated on the blockchain.

For the asset account, an account state of the account can also be specifically maintained by using a structure. Content included in the structure of the asset account may be the same as the content included in the structure of the account in Ethereum, or certainly may be designed based on an actual demand.

In an implementation, for example, the content included in the structure of the asset account is the same as the content included in the structure of the account in Ethereum. In this case, the structure of the asset account can also include the previously described fields such as Balance, Nonce, Code, and Storage.

It is worthwhile to note that, in Ethereum, the Balance field is usually used to maintain a current account balance of an account. However, for a blockchain model derived from the Ethereum architecture, because the blockchain model may not support conversion of a currency in the real world into a virtual coin that can be circulated on the chain, in such a blockchain, the meaning of the Balance field can be extended, so that the Balance field no longer represents the "balance" of the account, but is used to maintain address information of an asset account corresponding to a "virtual asset" held by the account. In practice, the Balance field can maintain address information of asset accounts corresponding to multiple "virtual assets".

In this case, the external account, the contract account, and the asset account shown above all can hold a virtual asset by adding address information of an asset account corresponding to the "virtual asset" that needs to be held to the Balance field. That is, in addition to the external account and the contract account, the asset account itself can also hold a virtual asset.

For the asset account, field values of the Nonce field and the Code field may be null (or may not be null), a field value of the Storage field may not be null anymore, and the Storage field may be used to maintain an asset state of a "virtual asset" corresponding to the asset account. A specific method for maintaining the asset state of the "virtual asset" corresponding to the asset account in the Storage field can be flexibly designed based on a demand, and details are omitted here for simplicity.

In a blockchain model derived from the Ethereum architecture, a user can use the following implementations to create a virtual asset that matches the value of a physical asset without a currency attribute in the real world value on the blockchain.

In an implementation, a transaction type supported by the blockchain can be extended to obtain a transaction for creating a virtual asset. For example, transaction types supported by Ethereum usually include a common transfer transaction, a transaction for creating a smart contract, and a transaction for invoking a smart contract. In this case, the three types of transactions can be extended to obtain a transaction for creating a virtual asset.

In this case, the user can publish a transaction for creating a virtual asset to the blockchain network by using a client, and a node device in the blockchain executes the transaction on a local EVM to create a virtual asset for the user. After an agreement is reached among node devices through a consensus mechanism, the virtual asset is successfully created, and an asset account corresponding to the virtual asset appears on the blockchain and has a specific address.

In another implementation, a smart contract for creating a virtual asset can be deployed on the blockchain, and details of a process of deploying the smart contract for creating a virtual asset are omitted here for simplicity.

In this case, the user can publish a transaction for invoking the smart contract to the blockchain network by using a client, and a node device in the blockchain executes the transaction on a local EVM, and runs contract code related to the smart contract on the EVM, to create a virtual asset for the user. After an agreement is reached among node devices through a consensus mechanism, the virtual asset is successfully created, and an asset account corresponding to the virtual asset appears on the blockchain and has a specific address.

Certainly, for some blockchain models derived from the Ethereum architecture, if the blockchain models also support the function of converting a currency in the real world into a virtual coin that can be circulated on the chain, some physical assets without a currency attribute in the real world can still be converted into a form of virtual coins that can be circulated on the blockchain, to be circulated on the blockchain. Details are omitted in the present specification.

In a cross-chain scenario, multiple blockchains can implement cross-chain connection through cross-chain relays.

The cross-chain relays can be separately connected to the multiple blockchains by using bridge interfaces, and complete cross-chain data synchronization among the multiple blockchains based on implemented data transport logic.

A cross-chain technology used to implement the cross-chain relays is not specially limited in the present specification. For example, in practice, multiple blockchains can be connected by using a cross-chain mechanism such as a side chain technology or a notary technology.

After the multiple blockchains are connected by using the cross-chain relays, data on other blockchains can be read and authenticated among the blockchains, and smart contracts deployed on other blockchains can be invoked among the blockchains by using the cross-chain relays.

In addition to using data stored in a blockchain, a smart contract deployed on the blockchain may reference data on a data entity off the chain by using an oracle machine, so as to implement data exchange between the smart contract and the data entity in the real world. The data entity off the chain can include a centralized server, data center, etc. deployed off the chain.

Different from the cross-chain relay, the oracle machine is not used to synchronize data on a blockchain to another blockchain, but is used to synchronize data on a data entity off a chain to the blockchain.

That is, the cross-chain relay is used to connect two blockchains, and the oracle machine is used to connect a blockchain and a data entity off the chain to implement data exchange between the blockchain and the real world.

Figure 4:
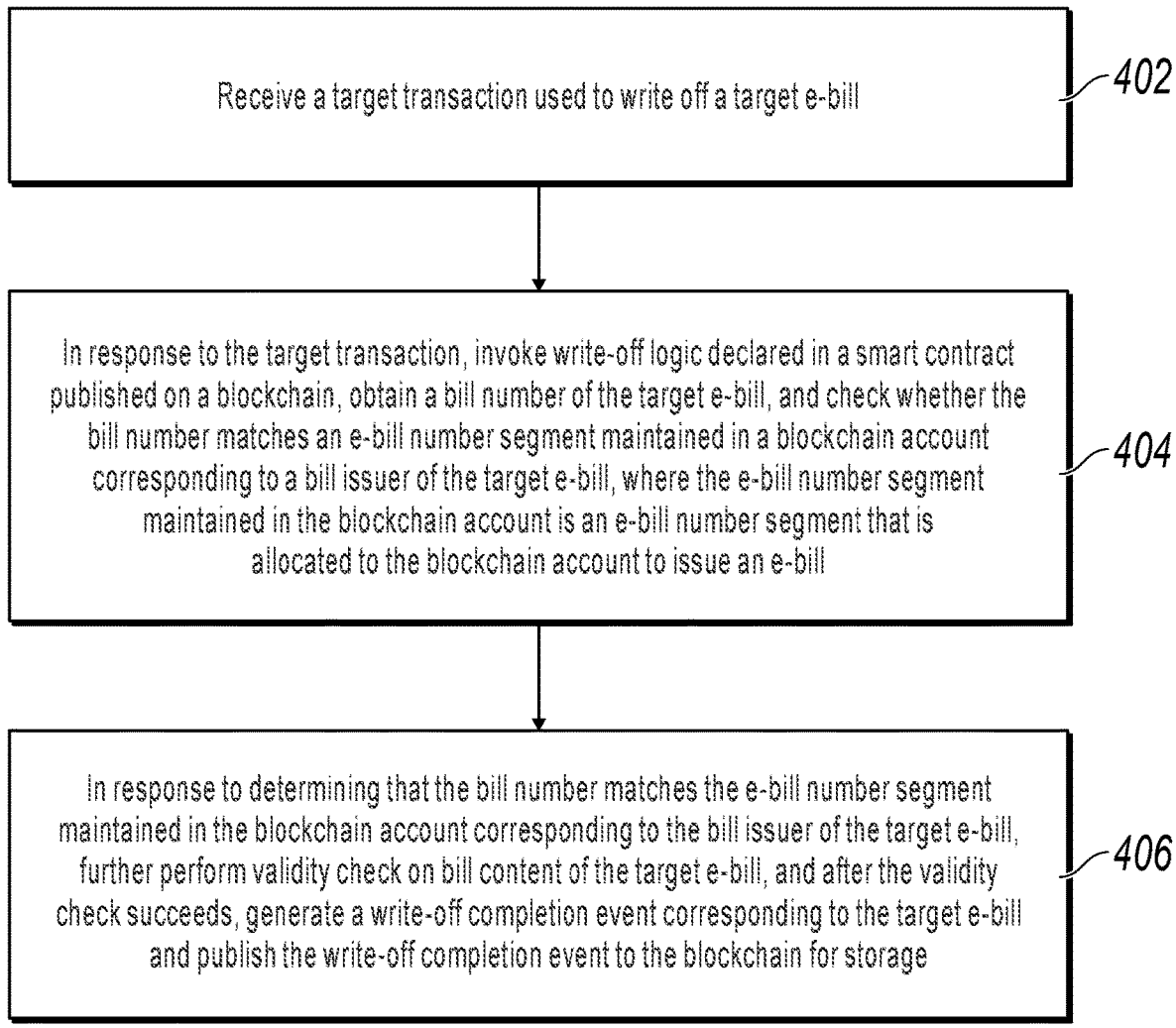
FIG. 4 is a flowchart illustrating a blockchain-based bill write-off method, according to an example implementation.

FIG. 4 is a flowchart illustrating a blockchain-based bill write-off method, according to an example implementation. As shown in FIG. 4, the method is applied to a blockchain node, and can include the following steps:

Step 402: Receive a target transaction used to write off a target e-bill.

In this implementation, a financial institution can establish multiple levels of accounts in advance, and configure a corresponding e-bill number segment for each level of account for use by a bill institution of each level of account to issue an e-bill. In other words, there is a "one-to-one mapping" relationship between e-bill numbers and e-bills. For example, multiple levels of accounts can be established based on "provincial office, city, and district/county". A financial account of the provincial office preconfigures an e-bill number segment of the whole province, and then allocates the configured e-bill number segment to a financial account of each city. After obtaining a corresponding e-bill number segment through application, the financial account of the city allocates the e-bill number segment to a financial account of each district/county.

Based on the system "multiple levels of accounts maintain e-bill number segments", a bill issuer can obtain an e-bill number by applying to an upper-level account. In an example implementation, a blockchain includes multiple levels of accounts used to maintain e-bill number segments, and a bill issuer can pack an application transaction (including an account identifier of an account of the bill issuer) and obtain an e-bill number by sending the application transaction to a blockchain node. After receiving the application transaction sent by the bill issuer, in response to the application transaction, the blockchain node can invoke number application logic declared in a smart contract published on the blockchain, determine an upper-level account of the blockchain account corresponding to the account identifier, and allocate an e-bill number to the bill issuer from an e-bill number segment maintained in the upper-level account; and add the allocated e-bill number to the blockchain account of the bill issuer. For example, if the bill issuer is a bill institution of a city, the corresponding upper-level account is a blockchain account of a financial institution of a provincial office. Alternatively, a bill institution of each level of account can apply to an upper-level financial account for an e-bill number by using a financial institution of the level, and then the financial institution of the level returns the e-bill number obtained through application. For example, a blockchain account of a financial institution of a city applies to a blockchain account of a financial institution of a provincial office for an e-bill number segment, and then allocates the e-bill number segment obtained through application to each bill institution of the city.

In a case, an e-bill can be issued offline by a bill issuer, and then issued by the bill issuer to a blockchain for storage. In another case, a smart contract for issuing an e-invoice by using an e-bill can be published on a blockchain in advance, and an e-bill number obtained by each bill issuer through application can be published on the blockchain for storage. In this case, after the smart contract is invoked to issue an e-bill, the issued e-bill can be published on the blockchain for storage.

After an e-bill is issued by using an e-bill number obtained through application, a bill issuer or a billing supervisor of the e-bill can initiate a write-off operation for the e-bill. Specifically, a target transaction used to write off the target e-bill can be packed, where the target transaction includes a bill identifier of the target e-bill. Bill code, check code, etc. may be used as the bill identifier, or the bill number may be directly used as the bill identifier.

Step 404: In response to the target transaction, invoke write-off logic declared in a smart contract published on a blockchain, obtain a bill number of the target e-bill, and check whether the bill number matches an e-bill number segment maintained in a blockchain account corresponding to a bill issuer of the target e-bill, where the e-bill number segment maintained in the blockchain account is an e-bill number segment that is allocated to the blockchain account to issue an e-bill.

In this implementation, because an e-bill number obtained by a bill issuer through application is added to a blockchain account of the bill issuer, based on a feature that the blockchain cannot be tampered with, the e-bill number can be checked to prevent a write-off initiator from writing off a forged e-bill.

Step 406: In response to determining that the bill number matches the e-bill number segment maintained in the blockchain account corresponding to the bill issuer of the target e-bill, further perform validity check on bill content of the target e-bill, and after the validity check succeeds, generate a write-off completion event corresponding to the target e-bill and publish the write-off completion event to the blockchain for storage.

In this implementation, after the check on the bill number of the target e-bill succeeds, the validity check is performed on the bill content of the target e-bill, so that the target e-bill can be more comprehensively written off. The bill content may be bill details, a bill amount, etc.

For example, when the validity check is performed on the bill content of the target e-bill, whether the bill amount of the target e-bill matches an entry amount of the target e-bill can be checked. In response to determining that the bill amount of the target e-bill matches the entry amount of the target e-bill, it is determined that the validity check succeeds. The entry amount is maintained by a billing supervisor. For example, the billing supervisor may be each level of financial institution. When an e-bill is issued, each level of financial institution is used as a bookkeeper of the bill.

The blockchain node can be connected to a server of the billing supervisor of the e-bill by using an oracle machine. Therefore, the blockchain node can obtain a result of comparison between the bill amount of the target e-bill and the entry amount of the target e-bill from the server of the billing supervisor by using the oracle machine, and can determine that the bill amount matches the entry amount when the obtained comparison result is that the bill amount is consistent with the entry amount.

In a case, the blockchain node can interact with the server of the billing supervisor by using an event mechanism. For example, after determining, through checking, that the bill number matches the e-bill number segment maintained in the blockchain account corresponding to the bill issuer of the target e-bill, the blockchain node can generate a check success event (including the bill amount of the target e-bill) for the bill number, so that when detecting the check success event through listening, the server of the billing supervisor compares the bill amount recorded in the check success event with the entry amount and returns the comparison result by using the oracle machine.

In another case, the blockchain node can actively obtain data from the server of the billing supervisor by using the oracle machine. For example, the blockchain node sends a request for obtaining the result of comparison between the bill amount and the entry amount of the target e-bill to the server of the billing supervisor by using the oracle machine, so that the server of the billing supervisor compares the bill amount with the entry amount of the target bill, and returns the comparison result by using the oracle machine.

It is worthwhile to note that the blockchain in the one or more implementations of the present specification can be a consortium chain. Consortium members of the consortium chain include multiple levels of financial institutions served as billing supervisors, and bill institutions served as bill issuers. A type of a request initiated on a blockchain by a user accessing the blockchain can specifically be a transaction used in a conventional blockchain. Certainly, a type of a request initiated on a blockchain by a user accessing the blockchain can be a form other than the transaction, such as an instruction or a message having a standard data structure, and is not specially limited in the one or more implementations of the present specification. In the following implementations, a type of a request initiated on a blockchain by a user accessing the blockchain is a transaction is used as an example.

In the previous technical solutions, an e-bill number segment is maintained in advance on a blockchain for a blockchain account to apply for a bill number. After each blockchain account obtains a bill number through application, the blockchain account can issue an e-bill by using the bill number obtained through application.

Based on the previous bill number application mechanism, when a target e-bill is written off, a smart contract is invoked to check whether a bill number of the target e-bill matches an e-bill number segment maintained in a blockchain account corresponding to a bill issuer of the target e-bill. Therefore, an e-bill forged by a write-off initiator can be prevented from being written off. Further, when the check on the bill number succeeds, validity check is performed on bill content of the target e-bill by using the smart contract. Therefore, the target e-bill can be comprehensively written off.

Figure 5:
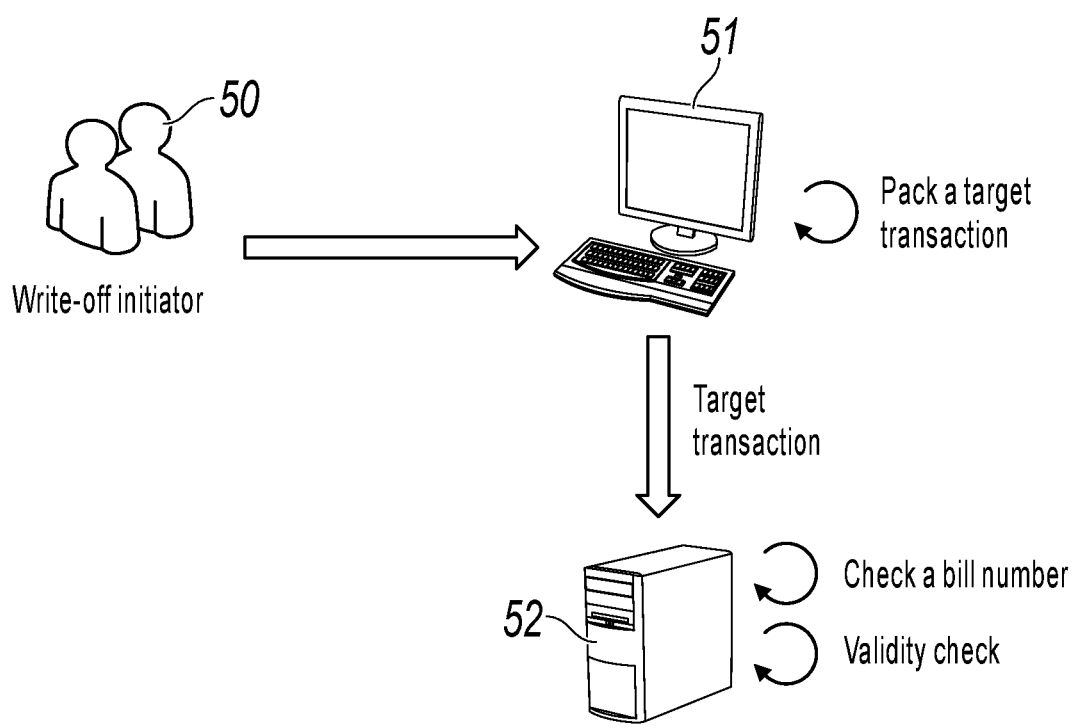
FIG. 5 is a schematic diagram illustrating an overall architecture of a blockchain-based bill write-off solution, according to an example implementation.

FIG. 5 is a schematic diagram illustrating an overall architecture of a blockchain-based bill write-off solution, according to an example implementation. As shown in FIG. 5, a client of a blockchain runs on server 52, so that server 52 is configured as a blockchain node. Write-off initiator 50 can perform account registration on server 52 in advance by using client 51, to obtain a registered account uniquely corresponding to the write-off initiator. Then, write-off initiator 50 can log in to the registered account on client 51, and server 52 determines, based on login information of the registered account on client 51, that a binding relationship is established between the registered account (corresponding to the write-off initiator) and client 51. The binding relationship that needs to be established is a binding relationship between account information of write-off initiator 50 and device information of client 51. Based on the binding relationship, when receiving a target transaction subsequently sent by client 51, server 52 can determine that the transaction corresponds to write-off initiator 50.

For example, for write-off, write-off initiator 50 can log in to the registered account on client 51, pack, by using client 51, a target transaction used to write off a target e-bill, and send the target transaction to server 52 by using client 51. After receiving the target transaction, server 52 (used as a blockchain node) invokes a smart contract to check a bill number and bill content of the target e-bill, and after the check succeeds, server 52 generates a write-off completion event and publishes the write-off completion event to the blockchain for storage.

Figure 6:
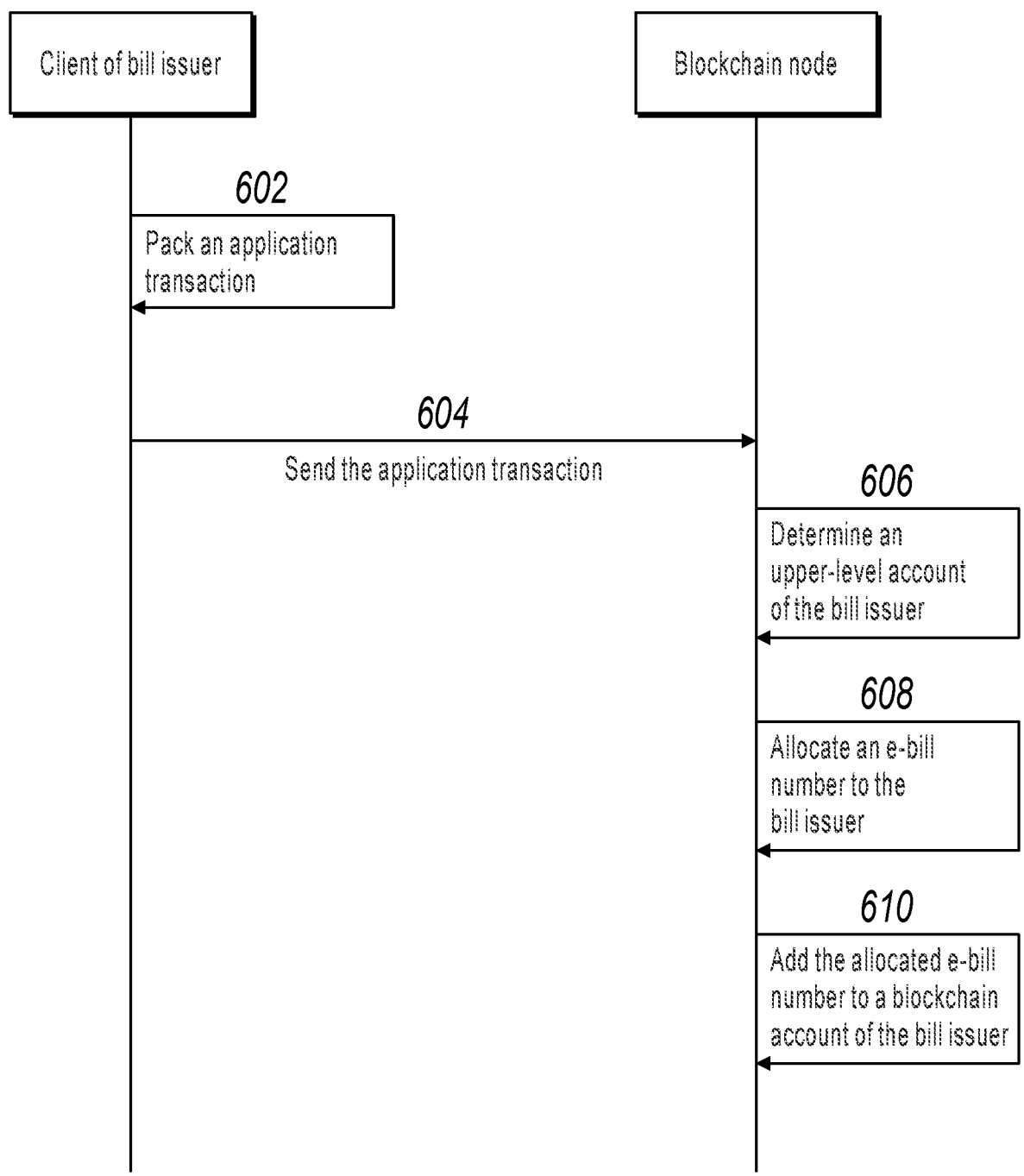
FIG. 6 is an interaction diagram illustrating e-bill number application, according to an example implementation.
Figure 7:
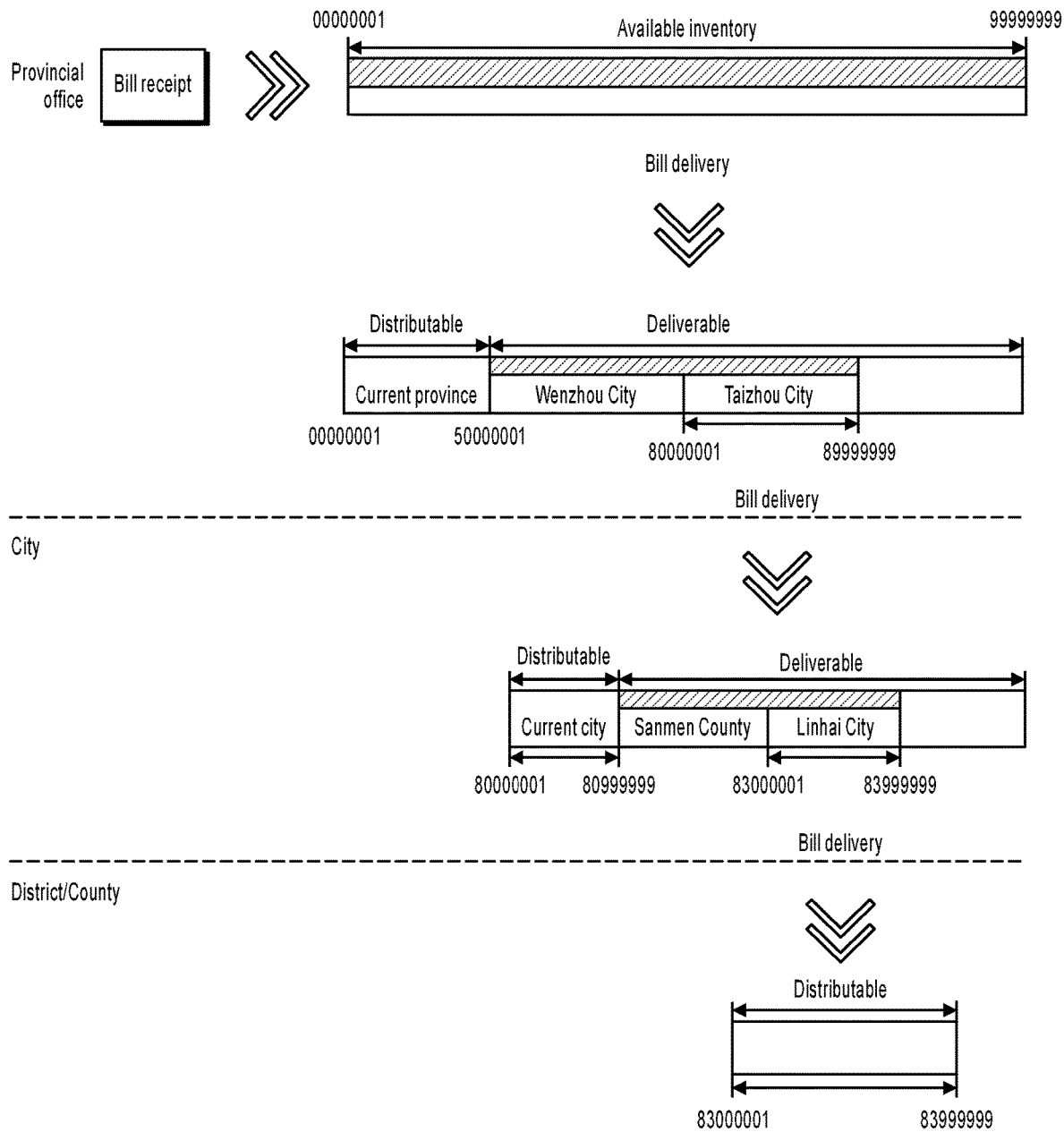
FIG. 7 is a schematic diagram illustrating e-bill number distribution and delivery, according to an example implementation.
Figure 8:
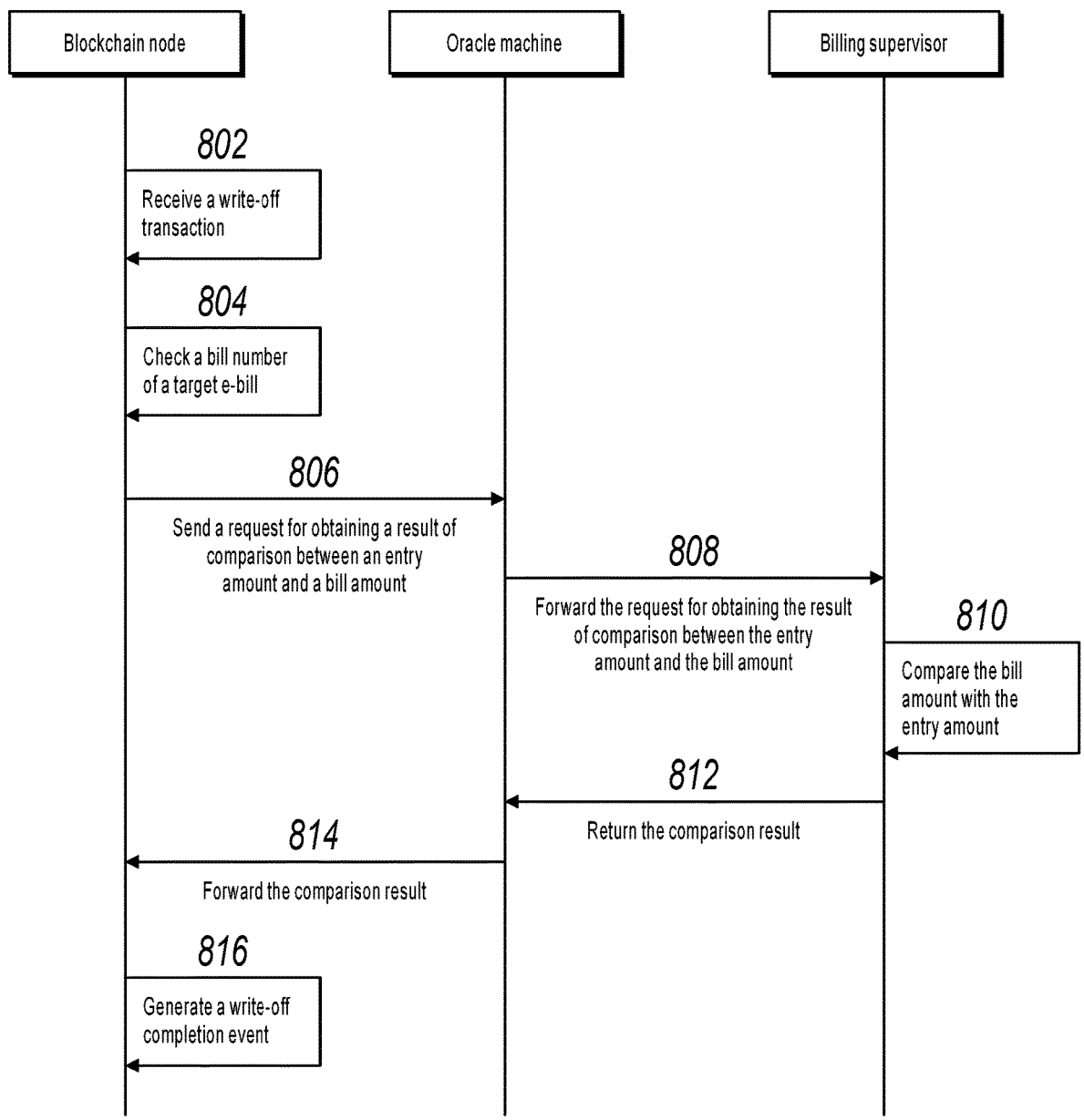
FIG. 8 is an interaction diagram illustrating e-bill write-off, according to an example implementation.

For ease of understanding, the following describes in detail the technical solutions of the present specification with reference to FIG. 6 to FIG. 8 for operations and functions that are respectively implemented by client 51 and server 52 (used as a blockchain node) in a write-off process. FIG. 6 is an interaction diagram illustrating e-bill number application, according to an example implementation. As shown in FIG. 6, the interaction process can include the following steps:

Step 602: A client of a bill issuer packs an application transaction.

In this implementation, for example, the bill issuer is used as a write-off initiator. The bill issuer can pack an application transaction by using the client, to apply for a bill number used to issue an e-bill. The application transaction includes an account identifier of an account of the bill issuer, for example, a registered account of the bill issuer.

A financial institution can establish multiple levels of accounts in advance, and configure a corresponding e-bill number segment for each level of account for use by a bill institution of each lower-level of account to issue an e-bill. In other words, there is a "one-to-one mapping" relationship between e-bill numbers and e-bill.

Step 604: The client of the bill issuer sends the application transaction to a blockchain node.

Step 606: The blockchain node determines an upper-level account of the bill issuer.

For example, multiple levels of accounts can be established based on "provincial office, city, and district/county". The provincial office is an upper-level account of the city, and the city is an upper-level account of the district/county.

Step 608: The blockchain node allocates an e-bill number to the bill issuer.

Step 610: Add the allocated e-bill number to a blockchain account of the bill issuer.

In this implementation, after allocating the e-bill number, the blockchain node can generate an event used to record an allocation result. In this case, when detecting the event through listening, the client of the bill issuer can obtain the e-bill number (which may be an e-bill number or an e-bill number segment) obtained through application this time.

For example, as shown in FIG. 7, an e-bill number segment 00000001 to 99999999 is added to a blockchain account of a finance department of a bill receipt provincial office. The e-bill number segment 00000001 to 99999999 can be used as an available inventory, and is divided into multiple e-bill number segments to be delivered to the current province and each city (a name of each city or district/county is used below to represent a corresponding blockchain account). For example, an e-bill number segment 00000001 to 50000000 is allocated to the current province for use, and then bill numbers included in the e-bill number segment 00000001 to 50000000 are distributed to bill institutions of the current province; and the remaining e-bill number segment 50000001 to 99999999 is delivered to cities (Wenzhou City, Taizhou City, Hangzhou City, etc.) for use. For example, for Taizhou City, a bill number segment 80000001 to 89999999 can be divided from the remaining e-bill number segment for use by Taizhou City.

Similarly, after a finance department of a city obtains a corresponding e-bill number segment through application, a part of the corresponding e-bill number segment can be distributed to the current city for use, and the other part can be delivered to lower-level administrative districts (districts/counties). For example, an e-bill number segment 80000001 to 80999998 is distributed to the current city for use; and in the remaining e-bill number segment, 80999999 to 83000000 are distributed to Sanmen County, and 83000001 to 83999999 are distributed to Linhai City.

It is worthwhile to note that an e-bill number segment (or e-bill number) obtained by each level of account through application can be maintained in a structure of each level of account. For example, meanings of fields such as Balance, Nonce, Code, and Storage can be extended. For example, the Balance field is used to maintain a distributable e-bill number segment of an account, and the Storage field is used to maintain a deliverable e-bill number segment of the account. In particular, for the lowest-level account (for example, Linhai City or Sanmen County) in multiple levels of accounts, the Balance field is used to maintain a distributable e-bill number segment of the account, and the Storage field is null.

Alternatively, the Balance field is used to maintain a deliverable e-bill number segment of an account, and the Storage field is used to maintain a distributable e-bill number segment of the account. Certainly, a specific extension method of each field can be flexibly designed based on a demand, and is not limited in the one or more implementations of the present specification.

After obtaining an e-bill number through application, a bill issuer can issue an e-bill by using the e-bill number obtained through application. There is a "one-to-one mapping" relationship between e-bills and e-bill numbers. In this case, when the bill issuer or a billing supervisor subsequently writes off the e-bill, the bill issuer or the billing supervisor can check the e-bill to be written off based on the e-bill number, so that an e-bill forged by a write-off initiator can be prevented from being written off.

FIG. 8 is an interaction diagram illustrating e-bill write-off, according to an example implementation. As shown in FIG. 8, the interaction process can include the following steps:

Step 802: A blockchain node receives a write-off transaction.

For example, for a consortium chain, a consortium chain member can declare write-off logic in a smart contract to write off a target e-bill. After developing the smart contract, the consortium chain member can publish the smart contract to the consortium chain by using any node device in the consortium chain, and the smart contract is stored in a block of the consortium chain after some specified member node devices in the consortium chain (for example, several specified authorized node devices having accounting permission in the consortium chain) reach a consensus on the smart contract.

Then, when a bill issuer or a billing supervisor needs to write off a target e-bill, the bill issuer or the billing supervisor can be used as a write-off initiator to pack a write-off transaction, where the write-off transaction includes a bill identifier of the target e-bill and an account identifier of a blockchain account of the bill issuer of the target e-bill. Bill code, check code, etc. can be used as the bill identifier, or a bill number can be directly used as the bill identifier.

Step 804: The blockchain node checks a bill number of a target e-bill.

In this implementation, after receiving the write-off transaction, in response to the target transaction, the blockchain node invokes write-off logic declared in a smart contract published on a blockchain, obtains the bill number of the target e-bill, and checks whether the bill number matches an e-bill number segment maintained in a blockchain account corresponding to a bill issuer of the target e-bill. When bill code, check code, etc. is used as a bill identifier, the blockchain node needs to first query, based on the bill identifier, a corresponding e-bill (namely, the target e-bill) stored in the blockchain, and then read the bill number from the queried e-bill.

For example, the blockchain node can determine, based on an account identifier included in the write-off transaction, an e-bill number segment maintained in a blockchain account (namely, a "distributable" e-bill number segment maintained in the account) of Linhai City, and then determine whether the bill number of the target e-bill belongs to the e-bill number segment. If the bill number of the target e-bill belongs to the e-bill number segment, the check succeeds. Still in the previous example, assume that the write-off initiator is a bill institution that belongs to Linhai City, the e-bill number segment maintained in the blockchain account of Linhai City is 83000001 to 83999999, and the bill number of the target e-bill is 83001001 (belonging to the e-bill number segment), it can be determined that the check succeeds.

Step 806: After the check on the bill number succeeds, the blockchain node sends, to an oracle machine, a request for obtaining a result of comparison between a bill amount and an entry amount of the target e-bill.

In this implementation, after the check on the bill number of the target e-bill succeeds, validity check can be further performed on bill content of the target e-bill, so that the target e-bill can be more comprehensively written off. The bill content may be bill details, the bill amount, etc.

For example, the bill content is the bill amount. The entry amount of the e-bill is maintained by a billing supervisor. For example, the billing supervisor may be each level of financial institution. When an e-bill is issued, each level of financial institution is used as a bookkeeper of the bill. Therefore, the blockchain node can obtain the result of comparison between the bill amount and the entry amount by using the oracle machine that is connected to a server of the billing supervisor.

Step 808: The oracle machine forwards the obtaining request to the billing supervisor.

Step 810: The billing supervisor compares the bill amount with the entry amount.

In a case, the obtaining request may include the bill identifier and the bill amount of the target e-bill. The billing supervisor reads, based on the bill identifier, the locally recorded entry amount of the target e-bill, compares the entry amount with the bill amount, and returns the comparison result to the blockchain node by using the oracle machine.

In another case, the obtaining request may include the bill identifier of the target e-bill. The billing supervisor reads, based on the bill identifier, the locally recorded entry amount of the target e-bill, and returns the entry amount to the blockchain node by using the oracle machine, so that the blockchain node compares the entry amount with the bill amount.

Step 812: The billing supervisor returns the comparison result to the oracle machine.

Step 814: The oracle machine forwards the comparison results to the blockchain node.

Step 816: The blockchain node generates a write-off completion event when the comparison result is that the bill amount is consistent with the entry amount.

In this implementation, when the write-off initiator detects, through listening, the write-off completion event corresponding to the target e-bill, the write-off initiator can determine that the target e-bill is written off. Further, the write-off initiator can further locally maintain a state machine corresponding to the target e-bill. When determining that the target e-bill is written off, the write-off initiator switches the state machine to a write-off complete state.

Corresponding to the previous method implementation, the present application further provides an apparatus implementation.

Corresponding to the previous method implementation, the present specification further provides an implementation of a blockchain-based bill write-off apparatus.

The implementation of the blockchain-based bill write-off apparatus in the present specification is applicable to an electronic device. The apparatus implementation can be implemented by software, hardware, or a combination of hardware and software. Software implementation is used as an example. As a logical apparatus, the apparatus is formed by reading a corresponding computer program instruction from a nonvolatile memory to a memory by a processor of an electronic device where the apparatus is located.

Figure 9:
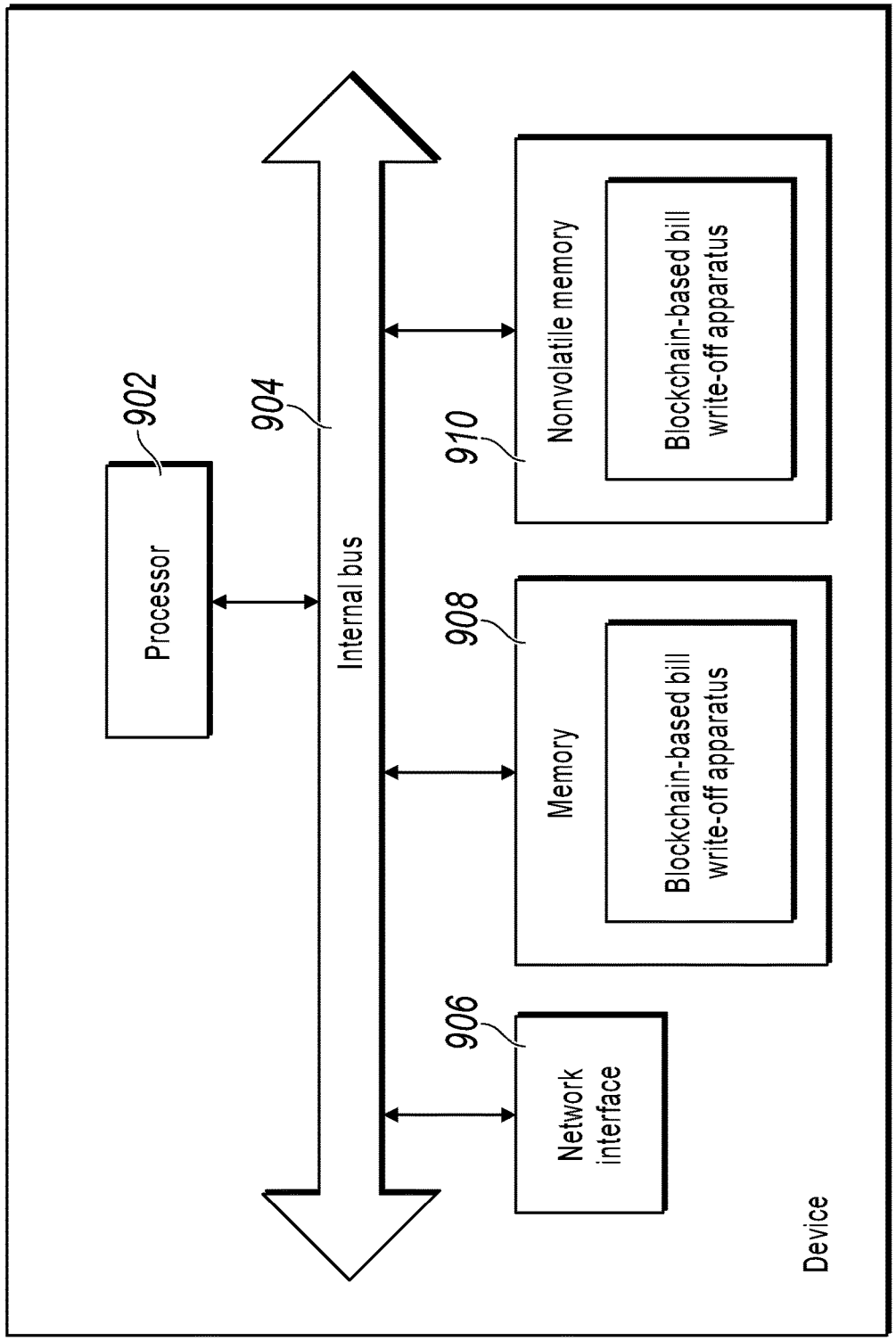
FIG. 9 is a schematic structural diagram illustrating a device, according to an example implementation.

In terms of hardware, FIG. 9 is a schematic structural diagram illustrating a device, according to an example implementation. As shown in FIG. 9, in terms of hardware, the device includes processor 902, internal bus 904, network interface 906, memory 908, and nonvolatile memory 910, and certainly may further include hardware needed by other services. Processor 902 reads a corresponding computer program from nonvolatile memory 910 to memory 908 and then runs the corresponding computer program, to logically form the blockchain-based bill write-off apparatus. Certainly, in addition to the software implementation, the one or more implementations of the present specification do not exclude other implementations, such as a logical device or a combination of hardware and software. That is, an execution body of the following processing procedure is not limited to each logical unit, and may be hardware or a logical device.

Figure 10:
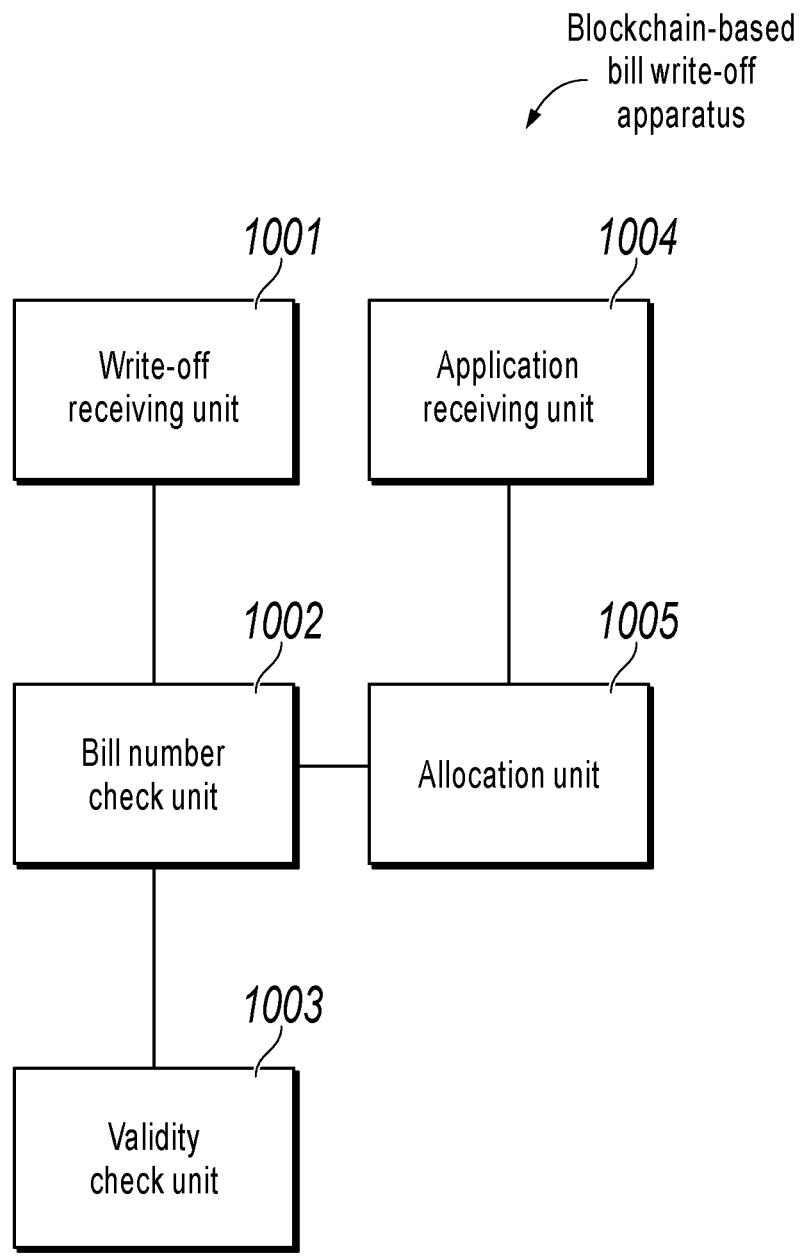
FIG. 10 is a block diagram illustrating a blockchain-based bill write-off apparatus, according to an example implementation.

Referring to FIG. 10, in a software implementation, the blockchain-based bill write-off apparatus is applied to a blockchain node, and the apparatus can include: write-off receiving unit 1001, configured to receive a target transaction used to write off a target e-bill; bill number check unit 1002, configured to: in response to the target transaction, invoke write-off logic declared in a smart contract published on a blockchain, obtain a bill number of the target e-bill, and check whether the bill number matches an e-bill number segment maintained in a blockchain account corresponding to a bill issuer of the target e-bill, where the e-bill number segment maintained in the blockchain account is an e-bill number segment that is allocated to the blockchain account to issue an e-bill; and validity check unit 1003, configured to: in response to determining that the bill number matches the e-bill number segment maintained in the blockchain account corresponding to the bill issuer of the target e-bill, further perform validity check on bill content of the target e-bill, and after the validity check succeeds, generate a write-off completion event corresponding to the target e-bill and publish the write-off completion event to the blockchain for storage.

Optionally, the blockchain includes multiple levels of accounts used to maintain e-bill number segments; and the apparatus further includes: application receiving unit 1004, configured to receive an application transaction sent by the bill issuer, where the application transaction includes an account identifier of the account of the bill issuer; and allocation unit 1005, configured to: in response to the application transaction, invoke number application logic declared in the smart contract published on the blockchain, determine an upper-level account of the blockchain account corresponding to the account identifier, and allocate an e-bill number to the bill issuer from an e-bill number segment maintained in the upper-level account; and add the allocated e-bill number to the blockchain account of the bill issuer.

Optionally, the bill content of the target e-bill includes a bill amount, and validity check unit 1003 is configured to: check whether the bill amount of the target e-bill matches an entry amount of the target e-bill; and in response to determining that the bill amount of the target e-bill matches the entry amount of the target e-bill, determine that the validity check succeeds.

Optionally, the blockchain node is connected to a server of a billing supervisor of the e-bill by using an oracle machine; and validity check unit 1003 is further configured to: obtain a result of comparison between the bill amount of the target e-bill and the entry amount of the target e-bill from the server of the billing supervisor by using the oracle machine; and determine that the bill amount matches the entry amount when the obtained comparison result is that the bill amount is consistent with the entry amount.

Optionally, validity check unit 1003 is further configured to: generate a check success event for the bill number after determining, through checking, that the bill number matches the e-bill number segment maintained in the blockchain account corresponding to the bill issuer of the target e-bill, so that when detecting the check success event through listening, the server of the billing supervisor compares the bill amount recorded in the check success event with the entry amount and returns the comparison result by using the oracle machine.

Optionally, validity check unit 1003 is further configured to: send a request for obtaining the result of comparison between the bill amount and the entry amount to the server of the billing supervisor by using the oracle machine, so that the server of the billing supervisor compares the bill amount with the entry amount of the target bill; and receive the comparison result returned by the server of the billing supervisor by using the oracle machine.

Optionally, the blockchain is a consortium chain, and consortium members of the consortium chain include multiple levels of financial institutions served as billing supervisors, and bill institutions served as bill issuers.

The system, apparatus, module, or unit illustrated in the previous implementations can be specifically implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an email sending/receiving device, a game console, a tablet computer, a wearable device, or any combination of these devices.

In a typical configuration, the computer includes one or more processors (CPUs), input/output interfaces, network interfaces, and memories.

The memory can include a non-persistent memory, a random access memory (RAM), a nonvolatile memory, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of a computer storage medium include but are not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, a quantum memory, a Graphene-based storage medium, another magnetic storage device, or any other non-transmission medium. The computer storage medium can be configured to store information accessible to a computing device. Based on the definition in the present specification, the computer-readable medium does not include computer-readable transitory media such as a modulated data signal and carrier.

It is worthwhile to further note that, the term "include", "comprise", or their any other variants is intended to cover a non-exclusive inclusion, so that a process, a method, a product, or a device that includes a series of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

Specific implementations of the present specification are described above. Other implementations fall within the scope of the appended claims. In some cases, the actions or steps recorded in the claims can be performed in an order different from the order in the implementation and the desired results can still be achieved. In addition, the process depicted in the accompanying drawings does not necessarily require the shown particular order to achieve the desired results. In some implementations, multi-tasking and parallel processing can be or may be advantageous.

The terms used in the one or more implementations of the present specification are merely intended to describe a particular implementation, but are not intended to limit the one or more implementations of the present specification. The terms "a", "the", and "this" of singular forms used in the one or more implementations of the present specification and the appended claims are also intended to include plural forms, unless otherwise specified in the context clearly. It is worthwhile to further note that the term "and/or" used in the present specification indicates and includes any or all possible combinations of one or more associated listed items.

It should be understood that although terms "first", "second", "third", etc. can be used in the one or more implementations of the present specification to describe various types of information, the information is not limited to the terms. These terms are only used to distinguish between information of the same type. For example, without departing from the scope of the one or more implementations of the present specification, first information can also be referred to as second information, and similarly, second information can also be referred to as first information. Depending on the context, for example, the word "if" used here can be explained as "while", "when", or "in response to determining".

The previous descriptions are only preferred implementations of the one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:
1. A computer-implemented method, comprising:
receiving, by a blockchain node of a blockchain from a bill issuer, an electronic-bill (e-bill) number application transaction that applies for an e-bill number issued by an official authority and has a one-to-one mapping to an e-bill, wherein:
the blockchain comprises a plurality levels of accounts for maintaining e-bill number segments, each of the e-bill number segments comprises one or more e-bill numbers that each correspond to a respective e-bill,
an e-bill number segment maintained by an account is a portion of an e-bill number segment maintained in an upper-level account of the account, and
the e-bill number application transaction comprises an account identifier of a blockchain account of the bill issuer;
in response to the e-bill number application transaction, invoking an e-bill number application logic declared in a smart contract published on the blockchain;
determining an upper-level account of the blockchain account of the bill issuer based on the account identifier of the blockchain account of the bill issuer;
allocating an e-bill number to the bill issuer from an e-bill number segment maintained in the upper-level account of the blockchain account of the bill issuer; and
adding the e-bill number to an e-bill number segment maintained in the blockchain account of the bill issuer;
receiving a target transaction to write off a target e-bill issued by the bill issuer, wherein writing off the target e-bill comprises verifying the target e-bill;
in response to the target transaction, invoking, by the blockchain node, a write-off logic declared in the smart contract published on the blockchain;
obtaining a target bill number of the target e-bill;
determining whether the target bill number is within the e-bill number segment maintained in the blockchain account of the bill issuer of the target e-bill;
in response to determining that the target bill number is within the e-bill number segment maintained in the blockchain account of the bill issuer of the target e-bill, performing validity check on bill content of the target e-bill, wherein the bill content of the target e-bill comprises a bill amount, and the performing validity check on bill content of the target e-bill comprises:
determining whether the bill amount of the target e-bill matches an entry amount of the target e-bill, wherein the blockchain node is connected to a server of a billing supervisor of the e-bill using an oracle machine; and
the determining whether the bill amount of the target e-bill matches an entry amount of the target e-bill comprises:
obtaining a result of comparison between the bill amount of the target e-bill and the entry amount of the target e-bill from the server of the billing supervisor using the oracle machine; and
in response to determining that the validity check succeeds, generating a write-off completion event corresponding to the target e-bill and publishing the write-off completion event to the blockchain for storage.
2. The computer-implemented method according to claim 1, wherein the official authority comprises a financial office of a province, a city, a district, or a county.

3. The computer-implemented method according to claim 1, wherein the performing validity check on bill content of the target e-bill further comprises:
in response to determining that the bill amount of the target e-bill matches the entry amount of the target e-bill, determining that the validity check succeeds.

4. The computer-implemented method according to claim 1, wherein
the determining whether the bill amount of the target e-bill matches an entry amount of the target e-bill further comprises:
determining that the bill amount matches the entry amount if the result of comparison is that the bill amount is consistent with the entry amount.

5. The computer-implemented method according to claim 1, wherein the obtaining a result of comparison between the bill amount of the target e-bill and the entry amount of the target e-bill from the server of the billing supervisor using the oracle machine comprises:
generating a check success event for the target bill number after determining, through checking, that the target bill number is within the e-bill number segment maintained in the blockchain account of the bill issuer of the target e-bill, wherein the check success event causes the server of the billing supervisor to compare the bill amount recorded in the check success event with the entry amount and return the result of comparison using the oracle machine.

6. The computer-implemented method according to claim 1, wherein the obtaining a result of comparison between the bill amount of the target e-bill and the entry amount of the target e-bill from the server of the billing supervisor by using the oracle machine comprises:
sending a request for obtaining the result of comparison between the bill amount and the entry amount to the server of the billing supervisor using the oracle machine to the server of the billing supervisor for comparing the bill amount with the entry amount of the target e-bill; and
receiving the result of comparison returned by the server of the billing supervisor using the oracle machine.

7. The computer-implemented method according to claim 1, wherein the blockchain comprises a consortium chain, and consortium members of the consortium chain comprise one or more levels of financial institutions serving as billing supervisors, and one or more bill institutions serving as bill issuers.

8. A computer-implemented system for blockchain-based bill write-off, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a blockchain node of a blockchain from a bill issuer, an electronic-bill (e-bill) number application transaction that applies for an e-bill number issued by an official authority and has a one-to-one mapping to an e-bill, wherein:
the blockchain comprises a plurality levels of accounts for maintaining e-bill number segments, each of the e-bill number segments comprises one or more e-bill numbers that each correspond to a respective e-bill,
an e-bill number segment maintained by an account is a portion of an e-bill number segment maintained in an upper-level account of the account, and
the e-bill number application transaction comprises an account identifier of a blockchain account of the bill issuer;
in response to the e-bill number application transaction, invoking an e-bill number application logic declared in a smart contract published on the blockchain;
determining an upper-level account of the blockchain account of the bill issuer based on the account identifier of the blockchain account of the bill issuer;
allocating an e-bill number to the bill issuer from an e-bill number segment maintained in the upper-level account of the blockchain account of the bill issuer; and
adding the e-bill number to an e-bill number segment maintained in the blockchain account of the bill issuer;
receiving a target transaction to write off a target e-bill issued by the bill issuer, wherein writing off the target e-bill comprises verifying the target e-bill;
in response to the target transaction, invoking, by the blockchain node, a write-off logic declared in the smart contract published on the blockchain;
obtaining a target bill number of the target e-bill;
determining whether the target bill number is within the e-bill number segment maintained in the blockchain account of the bill issuer of the target e-bill;
in response to determining that the target bill number is within the e-bill number segment maintained in the blockchain account of the bill issuer of the target e-bill, performing validity check on bill content of the target e-bill, wherein the bill content of the target e-bill comprises a bill amount, and the performing validity check on bill content of the target e-bill comprises:
determining whether the bill amount of the target e-bill matches an entry amount of the target e-bill, wherein the blockchain node is connected to a server of a billing supervisor of the e-bill using an oracle machine; and the determining whether the bill amount of the target e-bill matches an entry amount of the target e-bill comprises:
obtaining a result of comparison between the bill amount of the target e-bill and the entry amount of the target e-bill from the server of the billing supervisor using the oracle machine; and
in response to determining that the validity check succeeds, generating a write-off completion event corresponding to the target e-bill and publishing the write-off completion event to the blockchain for storage.

9. The computer-implemented system according to claim 8, wherein comprises a financial office of a province, a city, a district, or a county.

10. The computer-implemented system according to claim 8, wherein the performing validity check on bill content of the target e-bill further comprises:
in response to determining that the bill amount of the target e-bill matches the entry amount of the target e-bill, determining that the validity check succeeds.

11. The computer-implemented system according to claim 8, wherein
the determining whether the bill amount of the target e-bill matches an entry amount of the target e-bill further comprises:

determining that the bill amount matches the entry amount if the result of comparison is that the bill amount is consistent with the entry amount.

12. The computer-implemented system according to claim 8, wherein the obtaining a result of comparison between the bill amount of the target e-bill and the entry amount of the target e-bill from the server of the billing supervisor using the oracle machine comprises:
generating a check success event for the target bill number after determining, through checking, that the target bill number is within the e-bill number segment maintained in the blockchain account of the bill issuer of the target e-bill, wherein the check success event causes the server of the billing supervisor to compare the bill amount recorded in the check success event with the entry amount and return the result of comparison using the oracle machine.

13. The computer-implemented system according to claim 8, wherein the obtaining a result of comparison between the bill amount of the target e-bill and the entry amount of the target e-bill from the server of the billing supervisor by using the oracle machine comprises:
sending a request for obtaining the result of comparison between the bill amount and the entry amount to the server of the billing supervisor using the oracle machine to the server of the billing supervisor for comparing the bill amount with the entry amount of the target e-bill; and
receiving the result of comparison returned by the server of the billing supervisor using the oracle machine.

14. The computer-implemented system according to claim 8, wherein the blockchain comprises a consortium chain, and consortium members of the consortium chain comprise one or more levels of financial institutions serving as billing supervisors, and one or more bill institutions serving as bill issuers.

15. A non-transitory, computer-readable medium storing one or more instructions executable by a computer system to perform operations, comprising:
receiving, by a blockchain node of a blockchain from a bill issuer, an electronic-bill (e-bill) number application transaction that applies for an e-bill number issued by an official authority and has a one-to-one mapping to an e-bill, wherein:
the blockchain comprises a plurality levels of accounts for maintaining e-bill number segments, each of the e-bill number segments comprises one or more e-bill numbers that each correspond to a respective e-bill,
an e-bill number segment maintained by an account is a portion of an e-bill number segment maintained in an upper-level account of the account, and
the e-bill number application transaction comprises an account identifier of a blockchain account of the bill issuer;
in response to the e-bill number application transaction, invoking an e-bill number application logic declared in a smart contract published on the blockchain;
determining an upper-level account of the blockchain account of the bill issuer based on the account identifier of the blockchain account of the bill issuer;
allocating an e-bill number to the bill issuer from an e-bill number segment maintained in the upper-level account of the blockchain account of the bill issuer; and
adding the e-bill number to an e-bill number segment maintained in the blockchain account of the bill issuer;
receiving a target transaction to write off a target e-bill issued by the bill issuer, wherein writing off the target e-bill comprises verifying the target e-bill;
in response to the target transaction, invoking a write-off logic declared in the smart contract published on the blockchain;
obtaining a target bill number of the target e-bill;
determining whether the target bill number is within the e-bill number segment maintained in the blockchain account of the bill issuer of the target e-bill;
in response to determining that the target bill number is within the e-bill number segment maintained in the blockchain account of the bill issuer of the target e-bill, performing validity check on bill content of the target e-bill, wherein the bill content of the target e-bill comprises a bill amount, and the performing validity check on bill content of the target e-bill comprises:
determining whether the bill amount of the target e-bill matches an entry amount of the target e-bill, wherein the blockchain node is connected to a server of a billing supervisor of the e-bill using an oracle machine; and the determining whether the bill amount of the target e-bill matches an entry amount of the target e-bill comprises:
obtaining a result of comparison between the bill amount of the target e-bill and the entry amount of the target e-bill from the server of the billing supervisor using the oracle machine; and
in response to determining that the validity check succeeds, generating a write-off completion event corresponding to the target e-bill and publishing the write-off completion event to the blockchain for storage.

16. The non-transitory, computer-readable medium according to claim 15, wherein the official authority comprises a financial office of a province, a city, a district, or a county.

17. The non-transitory, computer-readable medium according to claim 15, wherein the performing validity check on bill content of the target e-bill comprises:
in response to determining that the bill amount of the target e-bill matches the entry amount of the target e-bill, determining that the validity check succeeds.

18. The non-transitory, computer-readable medium according to claim 17, wherein
the determining whether the bill amount of the target e-bill matches an entry amount of the target e-bill further comprises:
determining that the bill amount matches the entry amount if the result of comparison is that the bill amount is consistent with the entry amount.

19. The non-transitory, computer-readable medium according to claim 15, wherein the obtaining a result of comparison between the bill amount of the target e-bill and the entry amount of the target e-bill from the server of the billing supervisor using the oracle machine comprises:
generating a check success event for the target bill number after determining, through checking, that the target bill number is within the e-bill number segment maintained in the blockchain account of the bill issuer of the target e-bill, wherein the check success event causes the server of the billing supervisor to compare the bill amount recorded in the check success event with the entry amount and return the result of comparison using the oracle machine.

20. The non-transitory, computer-readable medium according to claim 15, wherein the obtaining a result of comparison between the bill amount of the target e-bill and the entry amount of the target e-bill from the server of the billing supervisor by using the oracle machine comprises:
   sending a request for obtaining the result of comparison between the bill amount and the entry amount to the server of the billing supervisor using the oracle machine to the server of the billing supervisor for comparing the bill amount with the entry amount of the target e-bill; and
   receiving the result of comparison returned by the server of the billing supervisor using the oracle machine.

* * * * *